United States Patent
Levy et al.

(10) Patent No.: US 9,695,772 B2
(45) Date of Patent: Jul. 4, 2017

(54) SYSTEM AND METHOD FOR ADJUSTING FUEL INJECTION PARAMETERS DURING TRANSIENT EVENTS TO REDUCE PARTICULATE EMISSIONS

(71) Applicant: GM Global Technology Operations LLC, Detroit, MI (US)

(72) Inventors: Robert S. Levy, Leonard, MI (US); David P. Sczomak, Troy, MI (US); Michael J. Lucido, Northville, MI (US); Jonathan T. Shibata, Whitmore Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 67 days.

(21) Appl. No.: 14/520,699

(22) Filed: Oct. 22, 2014

(65) Prior Publication Data

US 2016/0084192 A1    Mar. 24, 2016

Related U.S. Application Data

(60) Provisional application No. 62/054,669, filed on Sep. 24, 2014.

(51) Int. Cl.
*F02M 69/22* (2006.01)
*F02D 41/40* (2006.01)
(Continued)

(52) U.S. Cl.
CPC ....... *F02D 41/401* (2013.01); *F02D 41/0002* (2013.01); *F02D 41/345* (2013.01);
(Continued)

(58) Field of Classification Search
CPC ........ F02M 69/22; F02M 69/48; F02M 69/50; F02M 69/52; G01F 1/28
(Continued)

(56) References Cited

U.S. PATENT DOCUMENTS 5,740,045 A * 4/1998 Livshiz ................ F02P 5/1504
123/339.19
6,691,676 B2   2/2004 Konno
(Continued)

FOREIGN PATENT DOCUMENTS

JP    2009103106 A    5/2009
JP    2012117414 A *  6/2012

OTHER PUBLICATIONS

U.S. Appl. No. 14/958,013, filed Dec. 3, 2015, Sharon Xiaobin Li et al.

(Continued)

*Primary Examiner* — Hung Q Nguyen
*Assistant Examiner* — Charles Brauch

(57) ABSTRACT

A system according to the present disclosure includes a fuel control module and at least one of a desired air per cylinder (APC) module and a predicted manifold absolute pressure (MAP) module. The desired APC module determines a desired amount of airflow to each cylinder of an engine. The predicted MAP module predicts a pressure within an intake manifold of the engine at a future time. The fuel control module selectively adjusts a fuel injection parameter of the engine based on at least one of: a change in the desired air per cylinder from a first time to a second time; and a change in the predicted manifold pressure from the first time to the second time.

24 Claims, 4 Drawing Sheets

(51) Int. Cl.
*F02D 41/00* (2006.01)
*F02D 41/34* (2006.01)
*F02D 41/38* (2006.01)
*F02M 69/48* (2006.01)
*F02M 69/50* (2006.01)
*G01F 1/28* (2006.01)
*F02M 69/52* (2006.01)
*F02D 41/10* (2006.01)
*F02D 41/14* (2006.01)
*F02D 41/12* (2006.01)

(52) U.S. Cl.
CPC ....... *F02D 41/3836* (2013.01); *F02D 41/402* (2013.01); *F02D 41/10* (2013.01); *F02D 41/107* (2013.01); *F02D 41/12* (2013.01); *F02D 2041/1412* (2013.01); *F02D 2200/0402* (2013.01); *F02D 2200/0406* (2013.01); *F02D 2250/38* (2013.01); *F02M 69/22* (2013.01); *F02M 69/48* (2013.01); *F02M 69/50* (2013.01); *F02M 69/52* (2013.01); *G01F 1/28* (2013.01); *Y02T 10/42* (2013.01); *Y02T 10/44* (2013.01)

(58) Field of Classification Search
USPC .......................................... 123/455
See application file for complete search history.

(56) References Cited

U.S. PATENT DOCUMENTS

| | | | |
|---|---|---|---|
| 8,989,989 B2 | 3/2015 | Sczomak et al. | |
| 2002/0107633 A1* | 8/2002 | Iwasaki | F02D 13/0203 701/114 |
| 2003/0084861 A1* | 5/2003 | Machida | F01L 13/0021 123/90.15 |
| 2009/0100921 A1 | 4/2009 | Mc Lain et al. | |
| 2010/0057283 A1* | 3/2010 | Worthing | F02D 41/1497 701/22 |
| 2010/0292909 A1 | 11/2010 | Gwidt et al. | |
| 2011/0246048 A1 | 10/2011 | Fujii et al. | |
| 2013/0080031 A1* | 3/2013 | Knoebel | F02D 41/123 701/103 |
| 2013/0139768 A1 | 6/2013 | Takemoto | |
| 2014/0074381 A1 | 3/2014 | Sczomak et al. | |

OTHER PUBLICATIONS

U.S. Appl. No. 14/958,013, filed Dec. 3, 2015, Li et al.
JP2009103106A (Ashizawa, Takeshi) May 14, 2009 (machine translation). [online] [retrieved on Aug. 3, 2014]. Retrieved from: JPO using internet <URL: <http://www.ipdl.inpit.go.jp/homepg_e.ipdl>.

* cited by examiner

SYSTEM AND METHOD FOR ADJUSTING FUEL INJECTION PARAMETERS DURING TRANSIENT EVENTS TO REDUCE PARTICULATE EMISSIONS

CROSS-REFERENCE TO RELATED APPLICATIONS

This application claims the benefit of U.S. Provisional Application No. 62/054,669, filed on Sep. 24, 2014. The disclosure of the above application is incorporated herein by reference in its entirety.

FIELD

The present disclosure relates to internal combustion engines, and more specifically, to systems and methods for adjusting fuel injection parameters during transient events to reduce particulate emissions.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which generates drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

As an engine combusts air and fuel to generate drive torque, the engine produces particulates that pass into an exhaust system of the engine along with other emissions. Particulates include soot or smoke made up of micrometer-sized particles. The amount of particulates released into the atmosphere may be reduced by including a particulate filter in the exhaust system of the engine. However, particulate filters are costly and increase exhaust back pressure.

SUMMARY

A system according to the present disclosure includes a fuel control module and at least one of a desired air per cylinder (APC) module and a predicted manifold absolute pressure (MAP) module. The desired APC module determines a desired amount of airflow to each cylinder of an engine. The predicted MAP module predicts a pressure within an intake manifold of the engine at a future time. The fuel control module selectively adjusts a fuel injection parameter of the engine based on at least one of: a change in the desired air per cylinder from a first time to a second time; and a change in the predicted manifold pressure from the first time to the second time.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
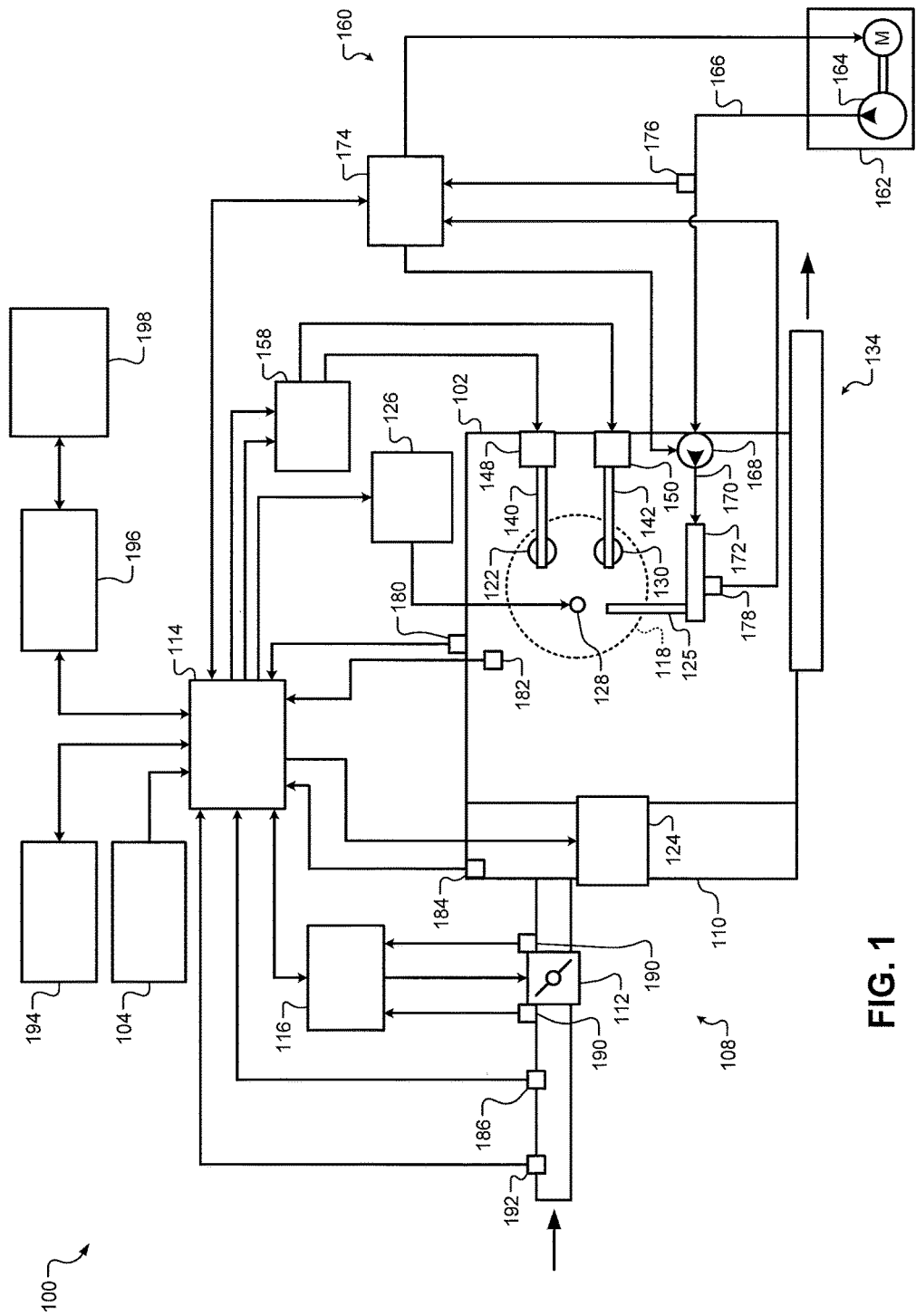
FIG. 1 is a functional block diagram of an example engine system according to the principles of the present disclosure.

There are three main reasons that an engine produces particulates. First, fuel injected into a cylinder of the engine may impinge and stick to the top surface of a piston in the cylinder. The likelihood of fuel impingement may be greater when the piston surface is cool. Second, fuel may mix poorly with air, causing local areas within the cylinder to have a rich air-fuel equivalence ratio (e.g., greater than 1.7). Third, fuel that remains on the surface of a fuel injector tip yield a diffusion flame, which leaves carbon deposits on the injector tip. In turn, the amount of particulates produced by an engine typically increases over time. This increase may be referred to as injector drift.

A system and method may adjust various fuel injection parameters to reduce particulate emissions instead of or in addition to using a particulate filter to reduce particulate emissions. For example, fuel impingement may be reduced by using multiple fuel injections for each combustion event and retarding injection timing. However, using multiple fuel injections may increase the diffusion flame, and retarding injection timing may decrease the amount of time allotted for air/fuel mixing. Air-fuel mixing may be improved by using multiple fuel injections and advancing injection timing to increase charge motion, increase evaporation, and increase the amount of time allotted for air-fuel mixing. However, as indicated above, multiple fuel injections may increase the diffusion flame, and advancing injection timing may increase fuel impingement. The diffusion flame may be reduced by limiting the usage of multiple fuel injections and thereby reducing the number of fuel injector closing events.

The amount of particulates produced by an engine is typically greater during transient events, or periods of transient operating conditions, relative to the amount of particulates produced by the engine during periods of steady-state engine operating conditions. Transient events occur when the amount of torque produced by an engine is rapidly increasing, such as when a driver depresses an accelerator pedal to a wide open throttle position. In contrast, periods of steady-state engine operating conditions occur when the amount of torque produced by an engine is relatively constant.

A system and method according to the present disclosure reduces particulate emissions by adjusting one or more fuel injection parameters during transient events. The fuel injection parameters include the number of fuel injections for each combustion event, an amount of fuel injected in each injection relative to a total amount of fuel injected for a combustion event, injection timing, and/or fuel injection pressure. The system and method adjusts the fuel injection parameters based on certain measures of the transient events to strike a balance between reducing fuel impingement, improving air-fuel mixing, and reducing diffusion flame.

In one example, the system and method adjusts the fuel injection parameters based on the magnitude of a transient event, as well as the actual engine speed and the actual amount of airflow to each cylinder of the engine at the beginning of the transient event. The system and method approximates the magnitude of the transient event using an indicator of a future engine load such as a change in a desired amount of airflow to each cylinder of the engine. In another example, the system and method increases the number of injections per combustion event and/or retards injection timing as the magnitude of the transient event increases and/or as the actual engine speed and the actual air per cylinder increase.

Referring now to FIG. 1, an engine system 100 includes an engine 102 that combusts an air/fuel mixture to produce drive torque for a vehicle. The amount of drive torque produced by the engine 102 is based on a driver input from a driver input module 104. The driver input may be based on a position of an accelerator pedal. The driver input may also be based on a cruise control system, which may be an adaptive cruise control system that varies vehicle speed to maintain a predetermined following distance.

Air is drawn into the engine 102 through an intake system 108. The intake system 108 includes an intake manifold 110 and a throttle valve 112. The throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls an injector actuator module 124, which regulates a fuel injector 125 to achieve a desired air/fuel ratio. The fuel injector 125 may inject fuel into the intake manifold 110 at a central location or at multiple locations, such as near the intake valve 122 of each of the cylinders. In various implementations, the fuel injector 125 may inject fuel directly into the cylinders, as shown in FIG. 1, or into mixing chambers associated with the cylinders. The injector actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 to generate a spark in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a spark timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The time at which the intake valve 122 is opened may be varied with respect to piston TDC by an intake cam phaser 148. The time at which the exhaust valve 130 is opened may be varied with respect to piston TDC by an exhaust cam phaser 150. A valve actuator module 158 may control the intake and exhaust cam phasers 148 and 150 based on signals from the ECM 114. When implemented, variable valve lift may also be controlled by the valve actuator module 158.

The ECM 114 may deactivate the cylinder 118 by instructing the valve actuator module 158 to disable opening of the intake valve 122 and/or the exhaust valve 130. The valve actuator module 158 may disable opening of the intake valve 122 by decoupling the intake valve 122 from the intake camshaft 140. Similarly, the valve actuator module 158 may disable opening of the exhaust valve 130 by decoupling the exhaust valve 130 from the exhaust camshaft 142. In various implementations, the valve actuator module 158 may control the intake valve 122 and/or the exhaust valve 130 using devices other than camshafts, such as electromagnetic or electrohydraulic actuators.

A fuel system 160 provides fuel to the fuel injector 125 for delivery to the cylinders. The fuel system 160 includes a fuel tank 162, a low pressure pump 164, a first fuel line 166, a high pressure pump 168, a second fuel line 170, and a fuel rail 172. The low pressure pump 164 delivers fuel from the fuel tank 162 to the high pressure pump 168 through the first fuel line 166. The low pressure pump 164 may be an electric pump.

The high pressure pump 168 pressurizes fuel from the first fuel line 166 and delivers the pressurized fuel to the fuel rail 172 through the second fuel line 170. The high pressure pump 168 may be driven by the intake camshaft 140 and/or the exhaust camshaft 142. The fuel rail 172 distributes the pressurized fuel to one or more fuel injectors of the engine 102, such as the fuel injector 125.

The ECM 114 controls a pump actuator module 174, which regulates the output of the low pressure pump 164 and the high pressure pump 168 to achieve a desired pressure in the first fuel line 166 and the fuel rail 172, respectively. A low side fuel pressure (LFP) sensor 176 measures the pressure of fuel in the first fuel line 166, which may be referred to as a low side pressure. A high side fuel pressure (HFP) sensor 178 measures the pressure of fuel in the fuel rail 172, which may be referred to as a high side pressure. The LFP sensor 176 and the HFP sensor 178 may provide the low side pressure and the high side pressure to the pump actuator module 174, which in turn may provide the low side pressure and the high side pressure to the ECM 114. Alternatively, the LFP sensor 176 and the HFP sensor 178 may provide the low side pressure and the high side pressure directly to the ECM 114.

The engine system 100 may measure the position of the crankshaft using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 uses signals from the sensors to make control decisions for the engine system 100.

The ECM 114 may communicate with a transmission control module (TCM) 194 to coordinate shifting gears in a transmission (not shown). For example, the ECM 114 may reduce engine torque during a gear shift. The ECM 114 may communicate with a hybrid control module (HCM) 196 to coordinate operation of the engine 102 and an electric motor 198. The electric motor 198 may also function as a generator, and may be used to produce electrical energy for use by the vehicle's electrical systems and/or for storage in a battery. In various implementations, various functions of the ECM 114, the TCM 194, and the HCM 196 may be integrated into one or more modules.

The ECM 114 reduces particulate emissions by adjusting one or more fuel injection parameters during transient events. The fuel injection parameters include the number of fuel injections for each combustion event, an amount of fuel injected in each injection relative to a total amount of fuel injected for a combustion event, injection timing, and/or fuel injection pressure (i.e., the pressure of fuel provided to the fuel injector 125). The ECM 114 adjusts the fuel injection parameters based on certain measures of the transient events to strike a balance between reducing fuel impingement, improving air-fuel mixing, and reducing diffusion flame. The measures may include the magnitude of a transient event, as well as the actual engine speed and amount of airflow to each cylinder of the engine 102 at the beginning of the transient event.

Figure 2:
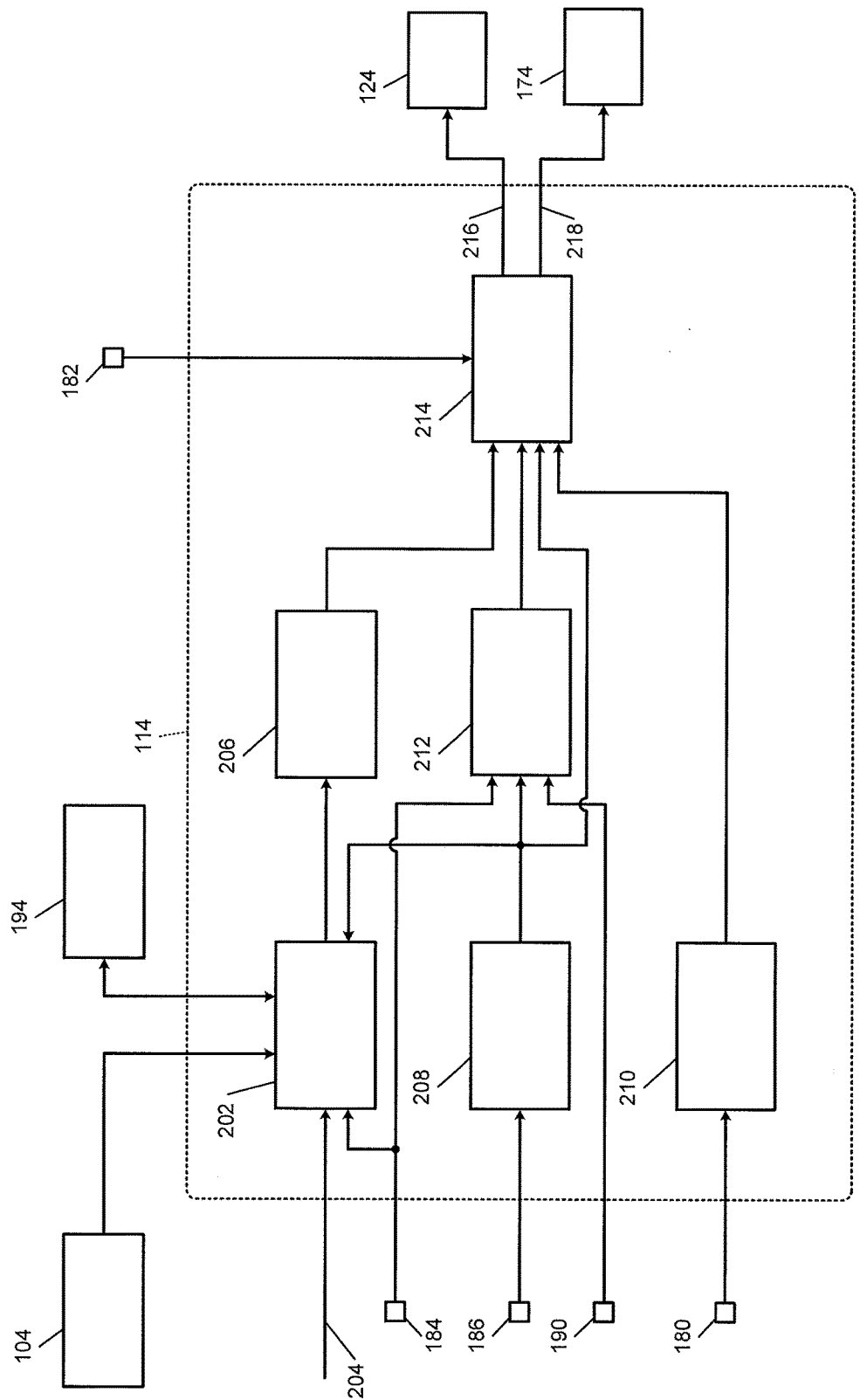
FIG. 2 is a functional block diagram of an example control system according to the principles of the present disclosure.

Referring now to FIG. 2, an example implementation of the ECM 114 includes a torque request module 202. The torque request module 202 determines a driver torque request based on the driver input from the driver input module 104. In one example, the torque request module 202 stores one or more mappings of accelerator pedal position to desired torque and determines the driver torque request based on a selected one of the mappings. The torque request module 202 may also determine the driver torque request based on the manifold pressure from the MAP sensor 184 and/or the actual air per cylinder (the actual amount of airflow to each cylinder of the engine 102).

The torque request module 202 may arbitrate between the driver torque request and other torque requests 204 and output one of the torque requests selected during the arbitration. The torque requests 204 may include a torque reduction requested by a traction control system when positive wheel slip is detected. Positive wheel slip occurs when axle torque (torque at the wheels) overcomes friction between the wheels and the road surface, and the wheels begin to slip against the road surface. The torque requests 204 may also include a torque increase request to counteract negative wheel slip, where a tire of the vehicle slips with respect to the road surface because the axle torque is negative.

The torque requests 204 may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. The torque requests 204 may also be generated by vehicle stability control systems.

The torque requests 204 may also include a transmission torque request, a launch torque request, and an engine capacity torque request. Transmission torque requests may be generated by the TCM 194 to facilitate a transmission shift. Launch torque requests may be generated while the vehicle is launching (accelerating from zero) to control the acceleration of the vehicle. Engine capacity torque requests may ensure that the selected torque request is within a range defined by the minimum and maximum torque capacity of the engine 102.

A desired air per cylinder (APC) module 206 determines a desired amount of airflow to each cylinder of the engine 102. The desired APC module 206 may determine the desired air per cylinder based on the torque request output by the torque request module 202. For example, the desired APC module 206 may determine the desired air per cylinder based on a predetermined relationship between the torque request and the desired air per cylinder. The predetermined relationship may be embodied in a lookup table and/or an equation. The desired APC module 206 may output the desired air per cylinder.

The desired APC module 206 may determine a running average of the desired air per cylinder over a predetermined period or a predetermined amount of crankshaft rotation. For example, the desired APC module 206 may determine the desired air per cylinder at a predetermined rate (e.g., 12.5 milliseconds), and the desired APC module 206 may determine the average value of a set of the desired air per cylinder values over the last two engine cycles. Each engine cycle corresponds to two rotations of the crankshaft. Each time that a new desired air per cylinder value is determined, the desired APC module 206 may remove the oldest value of the desired air per cylinder from the set, add the newest value of the desired air per cylinder to the set, and determined the average value of the set of the desired air per cylinder values. Thus, the average value may be referred to as a running average of the desired air per cylinder. The desired APC module 206 may output the running average of the desired air per cylinder.

An actual air per cylinder (APC) module 208 determines the actual air per cylinder. The actual APC module 208 may determine the actual air per cylinder based on the mass flow rate of air measured by the MAF sensor 186 and the number of active cylinders in the engine 102. For example, the actual APC module 208 may divide the product of the mass flow rate of air and a corresponding period by the number of active cylinders to obtain the actual air per cylinder. The actual APC module 208 outputs the actual air per cylinder.

A predicted manifold absolute pressure (MAP) module 212 predicts the pressure within the intake manifold 110 at a future time. The predicted MAP module 212 may predict the manifold pressure based on the manifold pressure measured by the MAP sensor 184 and the actual air per cylinder from the actual APC module 208. For example, the predicted MAP module 212 may predict the manifold pressure based on a predetermined relationship between the current manifold pressure, the current air per cylinder, and the predicted manifold pressure. The predetermined relationship may be embodied in a lookup table and/or an equation. The predicted MAP module 212 outputs the predicted manifold pressure.

An engine speed module 210 determines the actual engine speed. The engine speed module 210 may determine the engine speed based on the crankshaft position from the CKP sensor 180. For example, the engine speed module 210 may calculate the engine speed based on a period that elapses as the crankshaft completes one or more revolutions. The engine speed module 210 outputs the actual engine speed.

A fuel control module 214 reduces particulate emissions by adjusting one or more fuel injection parameters during transient events. The fuel injection parameters include the number of fuel injections for each combustion event, an amount of fuel injected in each injection relative to a total amount of fuel injected for a combustion event, injection timing, and/or fuel injection pressure. The fuel control module 214 may adjust the number of fuel injections, the amount of fuel injected in each injection, and the injection timing using an injector control signal 216 sent to the injector actuator module 124. The fuel control module 214 may adjust the fuel injection pressure using a pump control signal 218 sent to the pump actuator module 174.

The fuel control module 214 adjusts the fuel injection parameters based on certain measures of the transient events to strike a balance between reducing fuel impingement, improving air-fuel mixing, and reducing diffusion flame. The measures of the transient events include the magnitude of a transient event, as well as the actual engine speed and the actual air per cylinder at a first time. The first time may correspond to the beginning of the transient event.

In one example, the fuel control module 214 increases the number of injections per combustion event and/or retards injection timing as the magnitude of the transient event increases and/or as the actual engine speed and the actual air per cylinder increase. In another example, the fuel control module 214 may adjust the fuel injection parameters based on a predetermined relationship between the actual engine speed, the actual air per cylinder, and the magnitude of the transient event. The predetermined relationship may be embodied in a lookup table and/or an equation.

The fuel control module 214 uses an indicator of a future engine load, such as a change in the desired air per cylinder or a change in the predicted manifold pressure, as an approximation of the magnitude of the transient event. In one example, the fuel control module 214 approximates the magnitude of the transient event using a change in the running average of the desired air per cylinder from the first time to a second time. The second time may correspond to the end of the transient event. In another example, the fuel control module 214 approximates the magnitude of the transient event using a change in the predicted manifold pressure from the first time to the second time.

Figure 3:
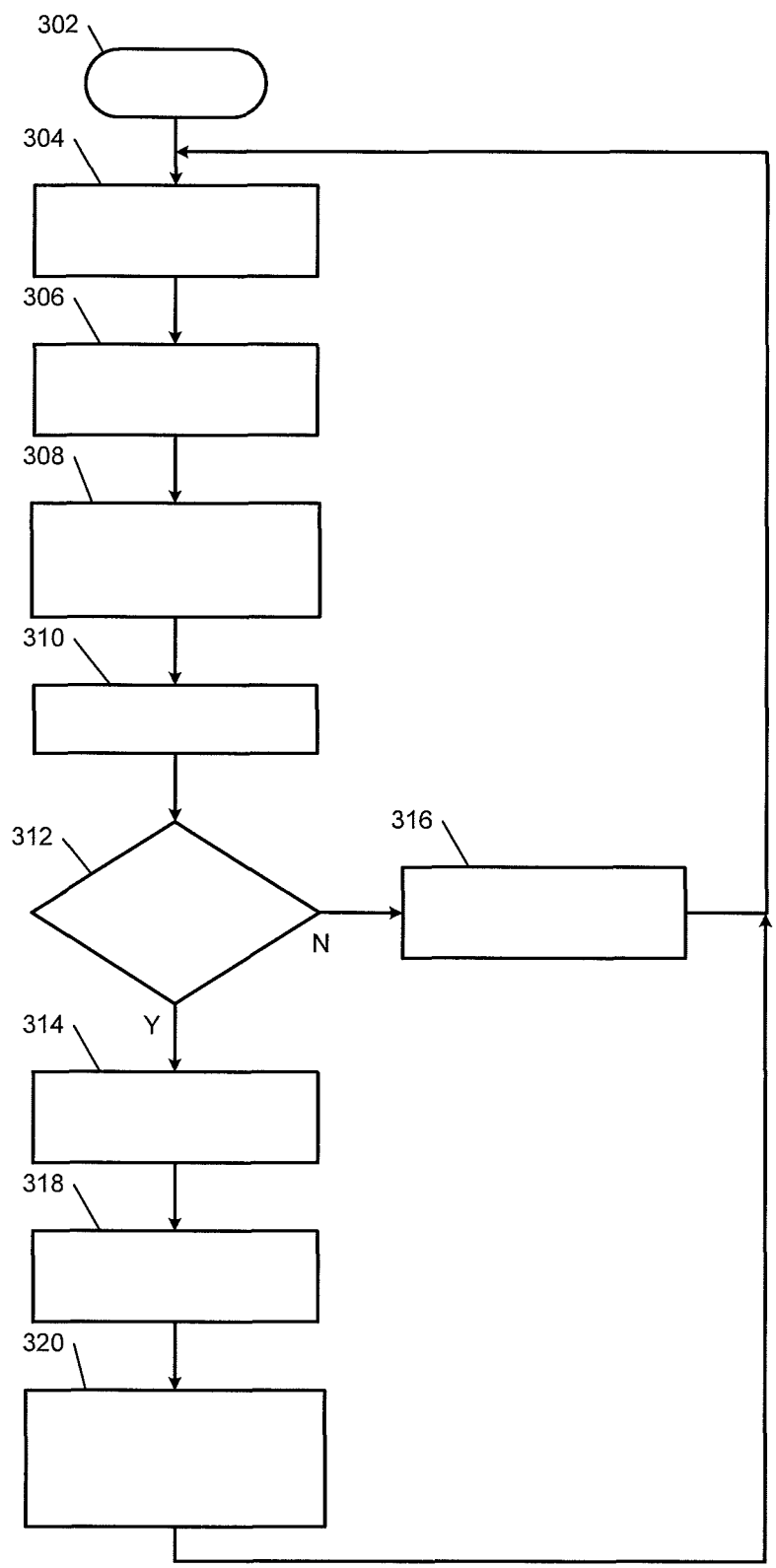
FIG. 3 is a flowchart illustrating an example control method according to the principles of the present disclosure.

Referring now to FIG. 3, a method for adjusting fuel injection parameters during transient events to reduce particulate emissions begins at 302. The method is described in the context of the modules included in the example implementation of the ECM 114 shown in FIG. 2 to further describe the functions performed by those modules. However, the particular modules that perform the steps of the method may be different than the description below and/or the method may be implemented apart from the modules of FIG. 2. For example, the method may be implemented by a single module.

At 304, the engine speed module 210 determines the actual engine speed at a first time. The first time may correspond to the beginning of a transient event. At 306, the actual APC module 208 determines the actual air per cylinder at the first time. At 308, the fuel control module 214 determines a change in the running average of the desired air per cylinder from the first time to a second time. The second time may correspond to the end of the transient event.

At 312, the fuel control module 214 determines a threshold. As discussed in more detail below, the fuel control module 214 compares the change in the running average of the desired air per cylinder to the threshold in order to determine whether to adjust the fuel injection parameters. The fuel control module 214 may determine the threshold based on the actual engine speed at the first time and the actual air per cylinder at the first time. For example, the fuel control module 214 may determine the threshold based on a predetermined relationship between the actual engine speed at the first time, the actual air per cylinder at the first time, and the threshold. The predetermined relationship may be embodied in a lookup table and/or an equation.

At 312, the fuel control module 214 determines whether the change in the running average of the desired air per cylinder is greater than the threshold. If the change in the running average of the desired air per cylinder is greater than the threshold, the fuel control module 214 continues at 314 and adjusts one or more of the fuel injection parameters from a first value to a second value. Otherwise, the fuel control module 214 continues at 316 and does not adjust the fuel injection parameters.

At 318, the fuel control module 214 maintains the fuel injection parameters at the second value for a first period (e.g., 3 seconds). At 320, the fuel control module 214 adjusts the fuel injection parameters from the second value to the first value. The fuel control module 214 may adjust (e.g., ramp up or ramp down) the fuel injection parameters from the second value to the first value over a second period. The first and second periods may be predetermined. Additionally, the fuel control module 212 may adjust the first and second periods based on the actual engine speed, the temperature of a piston within a cylinder of the engine 102, and/or the temperature of a combustion chamber associated with the cylinder. In one example, the fuel control module 212 may decrease the first and second periods as the actual engine speed increases and vice versa. In turn, the fuel injection parameters may be adjusted over a few number of combustion events relative to the number of combustion events over which the fuel injection parameters would be adjusted if the first and second periods were not decreased.

In another example, the fuel control module 212 may decrease the first and second periods as the rate of change in the piston temperature and/or the combustion chamber temperature increases and vice versa. The fuel control module 212 may estimate the piston temperature and/or the combustion chamber temperature based on engine operating conditions. The engine operating conditions may include engine speed, air per cylinder, intake air temperature, engine coolant temperature, air/fuel ratio, and spark timing.

As the temperature of the engine 102 increases, the amount of particulate emissions produced by the engine 102 during transient events may decrease. Thus, the fuel control module 214 may adjust the threshold based on the engine coolant temperature from the ECT sensor 182. For example, the fuel control module 214 may increase the threshold when the engine coolant temperature is greater than a first temperature. The first temperature may be a predetermined temperature (e.g., 90 degrees). Alternatively, when the engine coolant temperature is greater than the first temperature, the fuel control module 214 may decrease the amount by which the fuel injection parameters are adjusted. In one example, when the engine coolant temperature is greater than the first temperature, the fuel control module 214 may not adjust the fuel injection parameters regardless of whether the change in the running average of the desired air per cylinder is greater than the threshold.

In the description above, the fuel control module 214 determines a threshold based on the actual engine speed and air per cylinder at the first time, and adjusts fuel injection parameters when a change in the desired air per cylinder is greater than the threshold. However, the fuel control module 214 may not determine a threshold. Instead, the fuel control module 214 may determine the fuel injection parameters based on a predetermined relationship between the actual engine speed at the first time, the actual air per cylinder at the first time, and the change in the desired air per cylinder from the first time to the second time. The predetermined relationship may be embodied in a lookup table and/or an equation.

Figure 4:
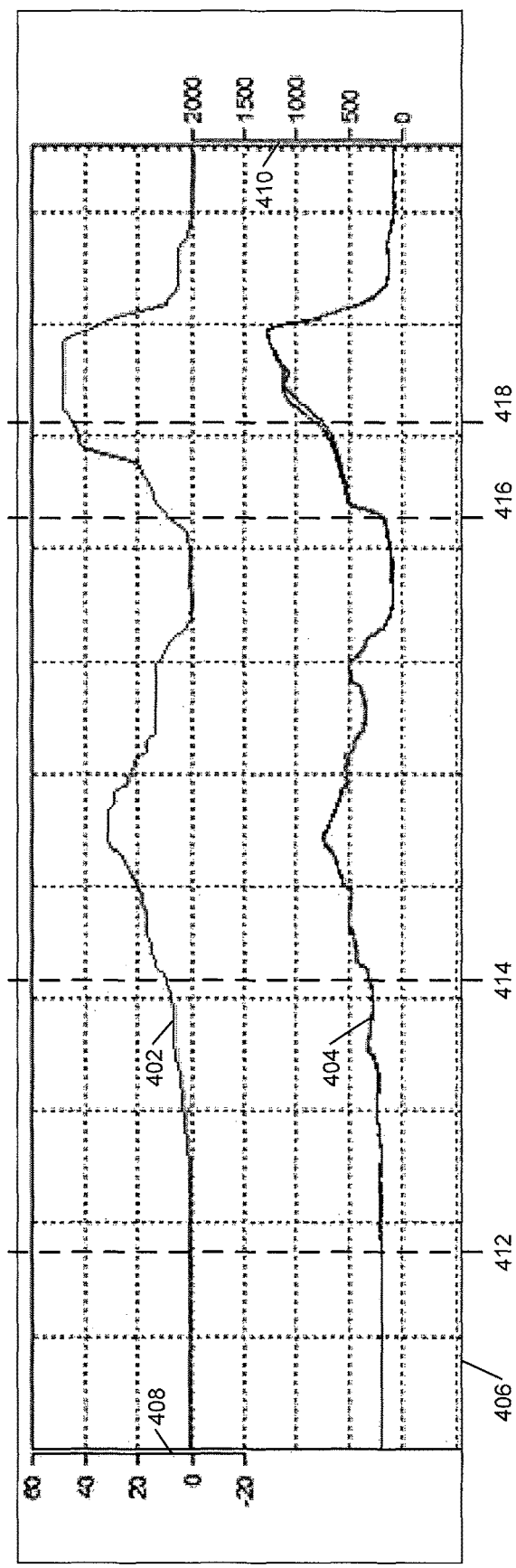
FIG. 4 is a graph illustrating example measures of transient events according to the principles of the present disclosure.

Referring now to FIG. 4, a pedal position signal 402 and an actual air per cylinder (APC) signal 404 are plotted with respect to an x-axis 406, a first y-axis 408, and a second y-axis 410. The x-axis 406 represents time in seconds. The first y-axis 408 represents percentage of accelerator pedal depression. The second y-axis 410 represents air per cylinder in milligrams.

At 412, the engine is idling, the vehicle is coasting, and any transient events that occur may be characterized as low or light transient events. Thus, a system and method according to the present disclosure may optimize fuel injection parameters for fuel economy and performance. The optimized fuel injection parameters may be less compromised for reducing particulate emissions relative to the fuel injection parameters during medium or large transient events. In one example, the optimized fuel injection parameters may include a single injection for each combustion event and a base start-of-injection (SOI) timing (e.g., 300 degrees before TDC).

As discussed above, the system and method may use a change in the running average of the desired air per cylinder as an approximation of the magnitude of a transient event. Light transient event may correspond to changes in the running average of the desired air per cylinder that are less than 4 milligrams. Medium transient events may correspond to changes in the running average of the desired air per cylinder that range from 4 milligrams to 7 milligrams. Large transient events may correspond to changes in the running average of the desired air per cylinder that are greater than or equal to 8 milligrams.

At 414, a medium transient event occurs at a low engine speed and a low engine load. In response, the system and method may increase the number of injections for each combustion event from one to two. In addition, the system and method may optimize the amount of fuel injected in each injection relative to the total amount of fuel injector for a single combustion event. For example, the system and method may inject 50 percent of the total amount in each of the two injections. The system and method may continue to execute two injections for each combustion event for a predetermined period (e.g., 3 seconds), and then return to executing a single injection for each combustion event when the predetermined period ends.

An engine speed that is less than or equal to 800 revolutions per minute (RPM) may be referred to as a low engine speed. An engine speed that is within a range from 800 RPM to 3000 RPM may be referred to as a medium engine speed. An engine speed that is greater than 3000 RPM may be referred to as a high engine speed.

The system and method may use the actual APC signal 404 as an approximation of engine load. An actual APC that is less than or equal to 100 milligrams may correspond to a low engine load. An actual APC that is within a range from 100 milligrams to 300 milligrams may be referred to as a medium engine load. An actual APC that is greater than 300 milligrams may correspond to as a high engine load.

At 416, a large transient event occurs at a low engine speed and a low engine load. In response, the system and method may increase the number of injections from one to three. In addition, the system and method may optimize the amount of fuel injected in each injection relative to the total amount of fuel injector for a single combustion event. For example, the system and method may inject about 33 percent of the total amount in each of the three injections. The system and method may continue to execute two injections for each combustion event for a predetermined period (e.g., 3 seconds), and then return to executing a single injection for each combustion event when the predetermined period ends.

At 418, a large transient event occurs at a medium engine speed and a medium engine load. In response, a system and method may increase the number of injections from one to two and optimize the amount of fuel injected in each injection relative to the total amount of fuel injector for a single combustion event. The system and method may also retard the SOI timing by a predetermined amount (e.g., 10 degrees to 50 degrees) relative to the base SOI timing.

The system and method may continue to execute two injections for each combustion event and to retard the SOI timing for a first period (e.g., 3 seconds). When the first period ends, the system and method may execute a single injection for each combustion event. The system and method may also adjust the SOI timing to the base SOI timing over a second period. The first and second periods may be predetermined and/or may be adjusted based on engine speed, piston temperature, and/or combustion chamber temperature as described above with reference to FIG. 2.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
   at least one of:
      a desired air per cylinder (APC) module that determines a desired amount of airflow to each cylinder of an engine; and
      a predicted manifold absolute pressure (MAP) module that predicts a pressure within an intake manifold of the engine at a future time; and
   a fuel control module that:
      determines at least one of:
         a change in the desired air per cylinder from a first time to a second time; and
         a change in the predicted manifold pressure from the first time to the second time; and
      selectively adjusts a fuel injection parameter of the engine based directly on at least one of:
         the change in the desired air per cylinder from the first time to the second time; and
         the change in the predicted manifold pressure from the first time to the second time.

2. The system of claim 1 wherein the fuel control module adjusts the fuel injection parameter further based on a measured engine speed at the first time and an actual air per cylinder at the first time.

3. The system of claim 2 further comprising an actual air per cylinder (APC) module that determines the actual air per cylinder based on a measured mass flow rate of air flowing to the intake manifold at the first time and a number of cylinders in the engine.

4. The system of claim 1 wherein the fuel control module adjusts the fuel injection parameter further based on a change in an average value of at least one of the desired air per cylinder and the predicted manifold pressure over a predetermined number of engine cycles.

5. The system of claim 1 wherein the fuel injection parameter includes at least one of a number of fuel injections for a combustion event, an amount of fuel injected for each fuel injection relative to a total amount of fuel injected for the combustion event, fuel injection timing, and fuel injection pressure.

6. The system of claim 5 wherein the fuel control module adjusts the fuel injection parameter when the at least one of the change the desired air per cylinder and the change in the predicted manifold pressure is greater than a threshold.

7. The system of claim 6 wherein, when the at least one of the change the desired air per cylinder and the change in the predicted manifold pressure is greater than the threshold, the fuel control module at least one of:
   increases the number of fuel injections for each combustion event; and
   retards the fuel injection timing.

8. The system of claim 6 wherein, when the at least one of the change in the desired air per cylinder and the change in the predicted manifold pressure is greater than the threshold, the fuel control module adjusts the fuel injection parameter from a first value to a second value and maintains the fuel injection parameter at the second value for a first period.

9. The system of claim 8 wherein, when the first period ends, the fuel control module adjusts the fuel injection parameter from the second value to the first value over a second period.

10. The system of claim 6 wherein, when an engine coolant temperature is greater than a first temperature, the fuel control module at least one of:

increases the threshold, and decreases the amount by which the fuel injection parameter is adjusted based on the at least one of the change the desired air per cylinder and the change in the predicted manifold pressure.

11. A method comprising:
at least one of:
   determining a desired amount of airflow to each cylinder of an engine; and
   predicting a pressure within an intake manifold of the engine at a future time;
determining at least one of:
   a change in the desired air per cylinder from a first time to a second time; and
   a change in the predicted manifold pressure from the first time to the second time; and
selectively adjusting a fuel injection parameter of the engine based directly on at least one of:
   the change in the desired air per cylinder from the first time to the second time; and
   the change in the predicted manifold pressure from the first time to the second time.

12. The method of claim 11 further comprising adjusting the fuel injection parameter further based on a measured engine speed at the first time and an actual air per cylinder at the first time.

13. The method of claim 12 further comprising determining the actual air per cylinder based on a measured mass flow rate of air flowing to the intake manifold at the first time and a number of cylinders in the engine.

14. The method of claim 11 further comprising adjusting the fuel injection parameter further based on a change in an average value of at least one of the desired air per cylinder and the predicted manifold pressure over a predetermined number of engine cycles.

15. The method of claim 11 wherein the fuel injection parameter includes at least one of a number of fuel injections for a combustion event, an amount of fuel injected for each fuel injection relative to a total amount of fuel injected for the combustion event, fuel injection timing, and fuel injection pressure.

16. The method of claim 15 further comprising adjusting the fuel injection parameter when the at least one of the change the desired air per cylinder and the change in the predicted manifold pressure is greater than a threshold.

17. The method of claim 16 further comprising, when the at least one of the change the desired air per cylinder and the change in the predicted manifold pressure is greater than the threshold, at least one of:
   increasing the number of fuel injections for each combustion event; and
   retarding the fuel injection timing.

18. The method of claim 16 further comprising, when the at least one of the change in the desired air per cylinder and the change in the predicted manifold pressure is greater than the threshold, adjusting the fuel injection parameter from a first value to a second value and maintaining the fuel injection parameter at the second value for a first period.

19. The method of claim 18 further comprising, when the first period ends, adjusting the fuel injection parameter from the second value to the first value over a second period.

20. The method of claim 16 further comprising, when an engine coolant temperature is greater than a first temperature, at least one of:
   increasing the threshold, and
   decreasing the amount by which the fuel injection parameter is adjusted based on the at least one of the change the desired air per cylinder and the change in the predicted manifold pressure.

21. The system of claim 1 wherein the fuel control module:
   determines the change in the desired air per cylinder from the first time to the second time; and
   selectively adjusts the fuel injection parameter based on the change in the desired air per cylinder from the first time to the second time.

22. The system of claim 1 wherein the fuel control module selectively adjusts the fuel injection parameter based on the change in the predicted manifold pressure from the first time to the second time.

23. The method of claim 11 further comprising:
   determining the change in the desired air per cylinder from the first time to the second time; and
   selectively adjusting the fuel injection parameter based on the change in the desired air per cylinder from the first time to the second time.

24. The method of claim 11 further comprising selectively adjusting the fuel injection parameter based on the change in the predicted manifold pressure from the first time to the second time.

* * * * *